Aug. 4, 1931.   A. C. FINNEY   1,817,744
INDICATING SYSTEM
Filed May 21, 1926

Inventor:
Alfred C. Finney
by
His Attorney.

Patented Aug. 4, 1931

1,817,744

UNITED STATES PATENT OFFICE

ALFRED C. FINNEY, OF SCHENECTADY, NEW YORK, ASSIGNOR TO GENERAL ELECTRIC COMPANY, A CORPORATION OF NEW YORK

INDICATING SYSTEM

Application filed May 21, 1926. Serial No. 110,807.

My invention relates to improvements in indicating systems for electric apparatus and more particularly to indicating systems for a plurality of dynamo electric machines which are arranged to be connected to a common bus whereby one indication is given when more than one of the machines are connected to the bus and another indication when none of the machines is connected to the bus.

My invention will be better understood from the following description taken in connection with the accompanying drawings and its scope will be pointed out in the appended claims.

Figure 1:
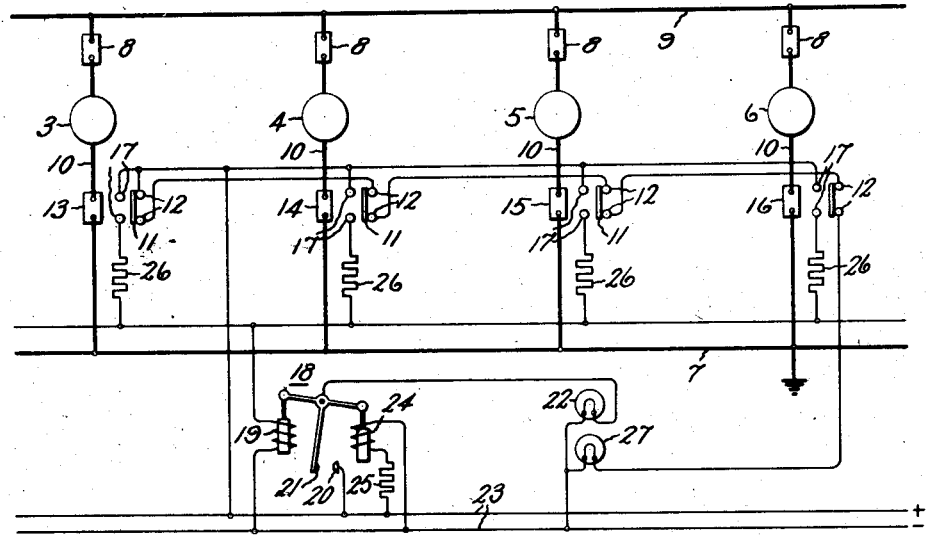
Figure 2:
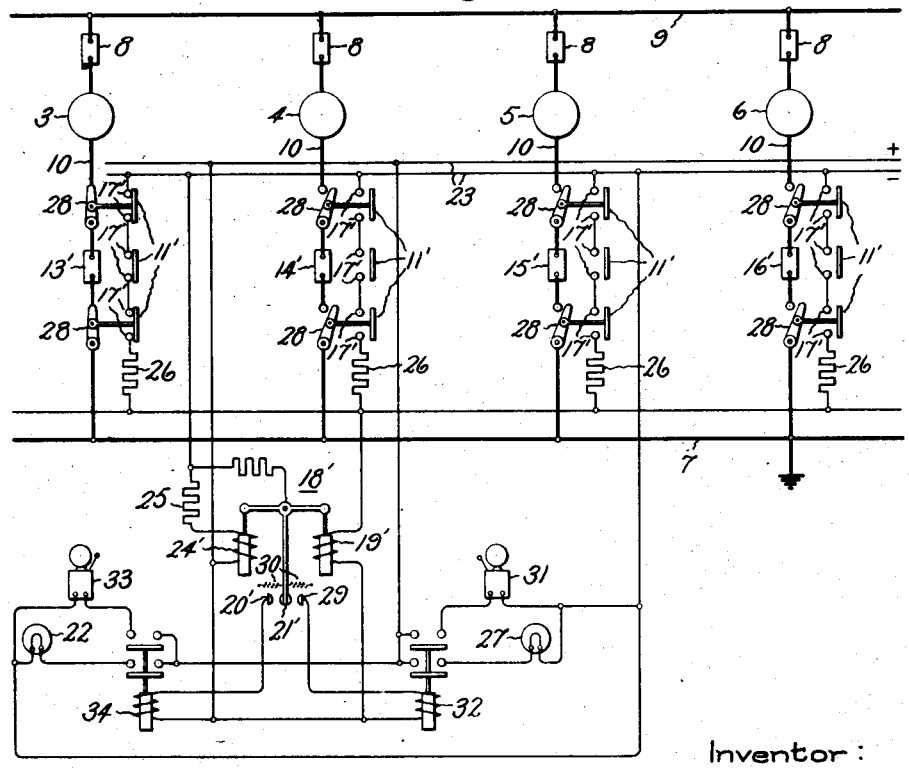

In the accompanying drawings Fig. 1 illustrates diagrammatically an indicating system embodying my invention, and Fig. 2 illustrates diagrammatically another embodiment of my invention.

Where a plurality of dynamo electric machines such as alternating current generators 3, 4, 5, 6 are arranged to be connected to a bus 7, which may be a neutral bus grounded directly or through a resistance, it is desirable to have not more than one of the generators connected to the neutral bus continuously because of the possibility of circulating currents, especially the triple frequency harmonic. The generators may be connected in parallel through suitable switches such as circuit breakers 8 to a supply bus 9, only one phase being shown for clearness.

Referring now in particular to Fig. 1, the neutral points, not shown, of the three phase generators, 3, 4, 5, 6, are brought out through leads 10 which are arranged to be connected to the neutral bus 7 through suitable connecting means or switches such as circuit breakers 13, 14, 15 and 16. These are provided with auxiliary switches shown as movable contact bridging members 11 which are arranged to close contacts 12 and open contacts 17 when the circuit breakers are open as shown and vice versa when the circuit breakers are closed.

In accordance with my invention, I provide means for indicating when none of the generators is connected to the neutral bus 7 and also when more than one of the generators are connected to the neutral bus 7. This means comprises an electroresponsive device such as a relay 18 having electromagnetic means including a winding 19 connected and arranged to have its energization varied in accordance with the number of generators connected to the bus 7 whereby to produce an effect dependent on the number of generators connected to the bus 7. This relay, through its relatively movable cooperating contacts 20 and 21, is arranged to control the circuit of suitable indicating means such as a red lamp 22 which is connected to a suitable source such as a control bus 23. The relay 18 as shown is of the differential type and comprises in addition to the winding 19, restraining means such as an opposing winding 24 which is opposed by the effect of the winding 19 and which is connected to be energized from the control bus 23 so that the effect on the winding 19 of fluctuations in the control bus voltage, due for example to heavy loads imposed thereon by circuit breaker closing coils and the like, is neutralized by the corresponding effect of the winding 24. The circuit of this winding may include a current limiting means such as a resistance 25. In order to have its energization controlled by the circuit breakers 13, 14, 15 and 16, the relay winding 19 is arranged to be connected across the control bus 23 through the contacts 17 of the circuit breaker auxiliary switches and resistances 26. The resistances 25 and 26 will be so proportioned that when only one of the circuit breakers 13, 14, 15, 16 is closed the force or effect of the winding 24 will predominate to hold the movable member of the relay 18 in one position, that is with the contacts 20 and 21 open as shown. When, however, more than one of the generator neutral circuit breakers are closed the force or effect of the relay winding 19 will predominate, since the resistance of the circuit of this winding will be decreased by virtue of the fact that more than one of the resistances 26 are then connected in parallel with each other and in series with the winding. In this case the movable member of the relay 18 is moved to another position such that the relay contacts 19 and 20 are closed and the red lamp 22 is lighted. This warns the operator that too many generators are connected to the bus 7. When none of the generators is connected to the bus 7 as shown in Fig. 1, the circuit of a suitable indicating means such as a green lamp 27 which is connected across the control bus 23 through the circuit breaker auxiliary switch contacts 12 in series will be completed. The operator consequently knows that, if for example, the proper functioning of the protective apparatus of the system is dependent on grounding the system, one of the neutral circuit breakers should be closed.

In the embodiment of my invention shown in Fig. 2, the generator neutral leads 10 are arranged to be connected to the neutral bus 7 through suitable connecting means such as circuit breakers 13', 14', 15', 16' and disconnecting switches 28 on each side thereof and in series relation therewith. The circuit breakers and the disconnecting switches are provided with auxiliary switches shown as movable bridging members 11' arranged to close contacts 17' when the circuit breakers and disconnecting switches are closed, and to open the contacts 17' when the circuit breakers and disconnecting switches are open.

Again in accordance with my invention, I provide means comprising the differential relay 18' for indicating whether more than one or none of the generators is connected to the neutral bus 7. The winding 24' of this relay may be connected across the control bus 23 through a resistance 25. In order to have its energization controlled in accordance with the number of generators connected to the neutral bus, the opposing winding 19' is connected in series-parallel with the resistances 26 through the auxiliary switch contacts 17' of the respective generator circuit breakers and associated disconnecting switches.

When only one of the generators such as generator 3 is connected to the neutral bus, as shown in Fig. 2, the windings 19' and 24' will be energized substantially alike and the movable contact 21' will be held in the intermediate position shown. In order to prevent closing of the contacts by vibration and slight inequalities of energization, suitable biasing means such as centering springs 30 may be provided.

If none of the generators is connected to the neutral bus 7, the winding 19' will be deenergized and consequently winding 24' will predominate. The relay contacts 21' and 29 then close and effect the energization of suitable indicating means such as a green lamp 27 and a bell alarm 31 through an auxiliary relay 32 whose contacts when closed complete the circuits of these indicating devices 27 and 31 which are connected across the control bus 23.

When more than one of the generators are connected to the neutral bus, the winding 19' will predominate, since it is then connected across the control bus 23 through more than one of the resistors 26 in parallel. In this case, the relay contacts 20', 21' close and effect the energization of suitable indicating means such as a red lamp 22 and a bell alarm 23 through an auxiliary relay 34 whose contacts, when closed, complete the circuits of these indicating devices which are connected across the control bus 23.

While I have shown and described my invention in considerable detail, I do not desire to be limited to the exact arrangements shown and described, but seek to cover in the appended claims all those modifications that fall within the true spirit and scope of my invention.

What I claim as new and desire to secure by Letters Patent of the United States, is,—

1. In combination, a plurality of alternating current dynamo electric machines each having a neutral point, a bus, means for connecting the neutral points to said bus and indicating means including a movable member, restraining means for moving said member to one position, electromagnetic means opposing said restraining means for moving said member to another position and means for controlling the energization of said electromagnetic means to cause the movement of said member to said other position only when the connecting means are in position to connect more than one of said machines to said bus.

2. In combination, a plurality of alternating current dynamo electric machines each having a neutral point, a bus, means for connecting the neutral points to said bus and indicating means including a movable member, restraining means for moving said member to one position when the connecting means are in position to connect none of said machines to said bus, electromagnetic means opposing said restraining means for moving said member to another position and means for controlling the energization of said electromagnetic means to cause the movement of said member to an intermediate position when the connecting means are in position to connect only one of said machines to the bus and to said other position only when the connecting means are in position to connect more than one of said machines to the bus.

3. In combination, a plurality of alternating current dynamo electric machines each having a neutral point, a bus, means for connecting the neutral points to said bus and indicating means including a movable member, restraining means for moving said member to one position when the connecting means are in a position to connect none of said machines to said bus, electromagnetic means opposing said restraining means for moving said member to another position and means for controlling the energization of said electromagnetic means to cause the movement of said member to an intermediate position when the connecting means are in position to connect only one of said machines to the bus and to said other position only when the connecting means are in position to connect more than one of said machines to the bus and indicating devices connected to be controlled by said member to give one indication when the member is moved to said one position and a different indication when the member is moved to said other position.

In witness whereof, I have hereunto set my hand this 20th day of May, 1926.

ALFRED C. FINNEY.